United States Patent Office 3,654,186
Patented Apr. 4, 1972

---

3,654,186
MANUFACTURE OF DEHYDROGENATION CATALYST
Kenneth D. Vesely, Arlington Heights, Ill., assignor to Universal Oil Products Company, Des Plaines, Ill.
No Drawing. Filed Apr. 13, 1970, Ser. No. 27,989
Int. Cl. B01j *11/32*
U.S. Cl. 252—465
5 Claims

ABSTRACT OF THE DISCLOSURE

A method of catalyst manufacture. Alumina, an alkali metal hydroxide and a soluble compound of chromium are prepared in aqueous slurry, the alumina being a substantially pure boehmite alumina monohydrate. The slurry is aged, spray-dried and calcined to yield a microspherical product particularly useful as a dehydrogenation catalyst in a fluidized type of operation.

---

The present invention is particularly useful with respect to dehydrogenation of ethane, propane, n-butane, iso-butane, n-pentane, iso-pentane, and the like. This invention is also applied advantageously in a process for the dehydrogenation of various other paraffinic hydrocarbons containing six or more carbon atoms per molecule. The products of the dehydrogenation reaction herein contemplated find extensive use in a variety of industries including the petroleum, petrochemical, pharmaceutical and plastic industries. For example, propylene is utilized in the manufacture of isopropyl alcohol, cumene, polypropylene, propylene dimer, trimer, and tetramer, and in the synthesis of isoprene. Butylenes, including butene-1, and cis- and trans-butene-2, are extensively employed in polymer and alkylate gasolines, in the manufacture of butadiene, aldehydes, and alcohols, as cross-linking agents for polymers, and in the synthesis of various $C_4$ and $C_5$ derivatives. Isobutene finds use in the production of iso-octane, butyl rubber, acrylonitrile, etc., while pentenes are primarily employed in organic synthesis, although 1-pentene is often used as a blending agent for high octane motor fuel.

Dehydrogenation as herein contemplated can be effected thermally at temperatures which avoid pyrolysis. However, the reaction proceeds so slowly that long periods are required to reach equilibrium and the olefin product yield is commercially insignificant. Of the numerous catalysts that have been proposed to catalyze the dehydrogenation reaction, those comprising chromia and alumina—and generally including an alkali metal promoter—are among the more prominent and the state of the art is well developed with respect thereto.

The chromia-alumina catalysts are generally employed in a fluidized type of operation wherein the catalyst particles are maintained as a fluidized suspension by the action of a gaseous or vaporous hydrocarbon reactant stream continuously passed through a reactor. By the very nature of the operation, the catalyst particles are buffeted about in collision with each other and the reactor walls and are subjected to rather severe attrition conditions. Preferably, the catalysts are employed in the form of small spheres generally referred to as microspheres.

As those familiar with the art of catalysis will appreciate, even minor variations in composition or method of manufacture often contribute significant and unexpected improvements and advantages with respect to a particular reaction. Thus, the method of preparation herein disclosed yields chromia-alumina microspheres at a substantially reduced cost of manufacture, the catalyst being unusually resistant to attrition under fluidized conditions, and exhibiting a high degree of activity, selectivity, and stability with respect to the dehydrogenation reaction herein contemplated.

In one of its broad aspects, the present invention embodies a method of catalyst manufacture which comprises commingling alumina and chromic acid in an aqueous medium, said alumina being a substantially boehmite alumina monohydrate; aging the resulting acidic mixture for at least one-half hour at ambient temperature; adjusting the pH in the range of from about 6 to about 8 by the addition of ammonia thereto and aging the resulting aqueous slurry for at least about 1 hour at said pH; spray-drying the aged slurry and calcining the spray-dried material in an oxidizing atmosphere at a temperature of from about 1000 to about 1400° F. to yield a microsphere catalyst product characterized by a surface area of from about 75 to about 150 square meters per gram.

The alumina employed as a starting material in accordance with the method of this invention is a substantially pure boehmite alumina monohydrate. Preferably, the alumina starting material is an alpha alumina monohydrate of the boehmite structure such as is produced as a by-product in the manufacture of alcohol through hydrolysis of an aluminum alcoholate or alkoxide. Being a by-product, the last mentioned alumina is relatively inexpensive and permits a substantial reduction in catalyst manufacturing cost. A particularly preferred boehmite alumina monohydrate is characterized by a crystallite size of less than about 100 angstroms and is commercially available in a substantially pure, finely divided form under the tradename Catapal.

Pursuant to the method of this invention, the alumina is prepared in aqueous mixture with chromic acid ($CrO_3$), otherwise known as chromium trioxide or chromic anhydride. Preferably, the alumina is prepared in aqueous mixture with an alkali metal hydroxide and chromic acid. The alkali metal hydroxide is preferably potassium hydroxide. Sodium, lithium, rubidium and/or cesium have also been shown to be suitable promoters and can be employed in the form of their hydroxides together with or in the place of potassium. The alkali metal hydroxide concentration of said mixture is such as to insure a final catalyst composite comprising from about 0.2 to about 5.0 wt. percent alkali metal calculated as the oxide. In preparing the alumina in aqueous mixture with the chromic acid, the alumina is reverted substantially to the sol form, the chromic acid acting as a peptizing agent. The chromic acid concentration of the mixture is sufficient to insure a final catalyst composite comprising from about 1.0 to about 50 wt. percent chromium of which at least 90 wt. percent is present as $Cr_2O_3$.

The resulting mixture is thereafter aged for a period of at least about one-half hour at the acidic conditions and with continuous mixing. Subsequent to the acid aging, the mixture is adjusted to a pH of from about 6 to about 8 by the addition of ammonia thereto, suitably as an ammonium hydroxide solution, whereby the mixture is converted to a slurry of a smooth consistency suitable for spray-drying. The ammonia is added slowly and with stirring to obviate premature setting of the mixture, and the slurry is then aged at said pH for a period of at least about 1 hour. The ammonia treatment has been found to be essential to the production of microspheres of suitable average bulk density, e.g., from about 0.5 to about 0.95 gms./cc. The water concentration of the slurry thus prepared is sufficient to provide a spray-drying mixture comprising from about 10 to about 25 wt. percent solids, the mixture being characterized by a loss of volatile matter upon ignition at 900° C. of from about 75 to about 90 wt. percent.

The aqueous slurry, mixed to a smooth consistency, is subjected to spray-drying techniques whereby the mixture is atomized in an atmosphere of hot, dry gases to effect a rapid evaporation of moisture so that dried microsphere particles fall out of the spray in a predetermined size range, e.g. 20–100 microns. The dried microspheres are calcined at a temperature of from about 1000° to about 1400° F. in an oxidizing atmosphere, preferably at a temperature of from about 1100° to about 1200° F. in a stream of dry air, to convert substantially all of the chromia to the +3 valence state ($Cr_2O_3$) and to establish the surface area of the microsphere particles in the range of from about 75 to about 150 m.²/gm. The time of calcination will vary with temperature but generally need not exceed about 10 hours.

The following example is presented in illustration of the method of this invention and is not intended as an undue limitation on the generally broad scope of the invention as set out in the appended claims.

EXAMPLE 103.5 lbs. of boehmite alumina (Conoco's Catapal N) was slurried in 790 lbs. of deionized water. 2.8 lbs. of potassium hydroxide and 26.4 lbs. of 99.8 wt. percent $CrO_3$ were then admixed with the slurry with vigorous stirring. The resulting aqueous mixture was aged for 30 minutes at ambient temperature, the pH of the mixture being about 0.8. Following the acid age, the pH was adjusted to about 7 by the addition of 25 wt. percent aqueous ammonia solution over a period of about 30 minutes, and the mixture was further aged at said pH for about 1 hour. At this stage, the aqueous slurry was characterized by a 90 wt. percent loss in volatile matter on ignition at 900° C. The slurry was spray-dried to yield microspheres in the 20–100 micron range and the spray-dried microspheres were calcined in a stream of dry air at 1200° F. for two hours. The calcined product had an average bulk density of 0.82 gms./cc., a surface area of 130 m.²/gm., an average pore volume of .20 cc./gm. and an average pore diameter of 62 A. The catalyst analyzed 77.5 wt. percent $Al_2O_3$, 20.0 wt. percent $Cr_2O_3$ and 2.0 wt. percent K.

The calcined microspheres were tested for attrition resistance by a method whereby 45 gms. of the calcined microspheres are fluidized in a high velocity air stream in a vertical tubular reactor of about 1″ I.D. The fines were continuously removed by elutriation and collected in a tared receiver which was weighed at intervals during the test. About 10 wt. percent of the catalyst was recovered as fines during the first 12 hours of the test. This represents fines originally contained in the catalyst as well as fines more readily produced from it. The average attrition rate of the catalyst was calculated from the amount of fines collected during the remaining 30 hours of the test—the average attrition rate being 0.71 wt. percent/hour.

I claim as my invention:

1. A method of catalyst manufacture which comprises commingling alumina and chromic acid in an aqueous media, said alumina being a substantially pure boehmite alumina monohydrate and said chromic acid being present in sufficient concentration to provide a final catalyst product comprising from about 1 to about 50 wt. percent chromia; aging the resulting acidic mixture for at least about one-half hour at ambient temperature, adjusting the pH in the range of from about 6 to about 8 by the addition of ammonia thereto, and aging the resulting aqueous slurry for at least about 1 hour at said pH; spray-drying the aged slurry and calcining the spray-dried material in an oxidizing atmosphere at a temperature of from about 1000° to about 1400° F. to yield a microsphere catalyst product characterized by a surface area of from about 75 to about 150 square meters per gram.

2. The method of claim 1 further characterized in that said alumina is commingled with an alkali metal hydroxide and chromic acid in an aqueous media.

3. The method of claim 1 further characterized in that said alumina is a substantially pure boehmite alumina monohydrate prepared by the hydrolysis of aluminum alcoholate and characterized by a crystallite size of less than about 100 angstroms.

4. The method of claim 2 further characterized in that said alkali metal hydroxide is potassium hydroxide.

5. The method of claim 2 further characterized in that said alkali metal hydroxide is present in said slurry in sufficient concentration to provide a final catalyst product comprising from about 0.2 to about 5 wt. percent alkali metal calculated as the oxide.

References Cited

UNITED STATES PATENTS

| | | | |
|---|---|---|---|
| 2,807,593 | 9/1957 | Dobres | 252—465 |
| 2,991,255 | 7/1961 | Malley | 252—455 |
| 3,520,828 | 7/1970 | Rosinski | 252—453 |
| 2,773,845 | 12/1956 | Stover | 252—465 |
| 2,819,229 | 1/1958 | Strecker | 252—448 |
| 2,435,379 | 2/1948 | Archibald | 252—259.2 |

DANIEL E. WYMAN, Primary Examiner

P. M. FRENCH, Assistant Examiner

U.S. Cl. X.R.

252—448